United States Patent
West et al.

(10) Patent No.: US 9,116,244 B1
(45) Date of Patent: Aug. 25, 2015

(54) SYSTEM FOR AND METHOD OF WEATHER PHENOMENON DETECTION USING MULTIPLE BEAMS

(71) Applicants: James B. West, Cedar Rapids, IA (US); Daniel L. Woodell, Holts Summit, MO (US)

(72) Inventors: James B. West, Cedar Rapids, IA (US); Daniel L. Woodell, Holts Summit, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 240 days.

(21) Appl. No.: 13/781,449

(22) Filed: Feb. 28, 2013

(51) Int. Cl.
*G01S 13/95* (2006.01)
*G01S 7/292* (2006.01)
*G01S 7/41* (2006.01)
*G01S 13/524* (2006.01)
*G01S 13/00* (2006.01)
*G01S 7/00* (2006.01)

(52) U.S. Cl.
CPC .............. *G01S 13/953* (2013.01); *G01S 7/292* (2013.01); *G01S 7/414* (2013.01); *G01S 13/5244* (2013.01)

(58) Field of Classification Search
CPC ....... G01S 13/88; G01S 13/95; G01S 13/953; G01S 13/955; G01S 7/02; G01S 7/41; G01S 7/414; G01S 7/28; G01S 7/285; G01S 7/292; G01S 13/02; G01S 13/50; G01S 13/52; G01S 13/522; G01S 13/524; G01S 13/5244
USPC .......... 342/26 R–26 D, 175, 192–197, 61–65, 342/73–81, 104–115, 118, 134–145, 342/159–163, 176, 179
See application file for complete search history.

(56) References Cited

U.S. PATENT DOCUMENTS

| 650,275 A | 5/1900 | Reeve |
| 3,251,057 A | 5/1966 | Buehler et al. |

(Continued)

FOREIGN PATENT DOCUMENTS

| EP | 1 329738 B1 | 7/2003 |
| FR | 2658617 A1 | 8/1991 |

(Continued)

OTHER PUBLICATIONS

U.S. Appl. No. 11/851,323, filed Sep. 6, 2007, McCusker.

(Continued)

*Primary Examiner* — Bernarr Gregory
(74) *Attorney, Agent, or Firm* — Angel N. Gerdzhikov; Donna P. Suchy; Daniel M. Barbieri

(57) ABSTRACT

The method includes providing a first radar pulse at a first beam position during a radar scan and receiving a first return, the first radar pulse being a velocity sampling beam. The method also includes providing a second radar pulse at a second and different beam position during the radar scan and receiving a second return, the second radar pulse overlaps and is not identical to the first radar pulse. The method further includes providing a third radar pulse using a lower gain wider beam width beam pattern at the first beam position during the radar scan and receiving a third radar return, the third radar pulse being a side lobe detection beam. The method can also include processing the first return, the second return and the third return and using data associated with the first return, the second return and the third return to determine a presence of weather phenomenon and to identify and remove returns from non-weather targets.

20 Claims, 5 Drawing Sheets

(56) References Cited

U.S. PATENT DOCUMENTS

| | | | |
|---|---|---|---|
| 3,359,557 A | 12/1967 | Fow et al. |
| 3,404,396 A | 10/1968 | Buchler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,028,929 A * | 7/1991 | Sand et al. | 342/26 B |
| 5,036,334 A | 7/1991 | Henderson et al. |
| 5,049,886 A | 9/1991 | Seitz et al. |
| 5,059,967 A * | 10/1991 | Roos | 342/26 B |
| 5,077,558 A | 12/1991 | Kuntman |
| 5,111,400 A | 5/1992 | Yoder |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,289,277 B1 | 9/2001 | Feyereisen et al. |
| 6,297,772 B1 | 10/2001 | Lewis |
| 6,308,122 B1 | 10/2001 | Nishizaki et al. |
| 6,340,946 B1 | 1/2002 | Wolfson et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,456,226 B1 | 9/2002 | Zheng et al. |
| 6,480,142 B1 | 11/2002 | Rubin |
| 6,489,915 B1 * | 12/2002 | Lines et al. | 342/26 B |
| 6,496,252 B1 | 12/2002 | Whiteley |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |

(56) References Cited

U.S. PATENT DOCUMENTS

| | | | |
|---|---|---|---|
| 7,200,491 B1 | 4/2007 | Rose et al. | |
| 7,242,343 B1 | 7/2007 | Woodell | |
| 7,259,714 B1 | 8/2007 | Cataldo | |
| 7,292,178 B1 | 11/2007 | Woodell et al. | |
| 7,307,576 B1 | 12/2007 | Koenigs | |
| 7,307,577 B1 | 12/2007 | Kronfeld et al. | |
| 7,307,583 B1 | 12/2007 | Woodell et al. | |
| 7,307,756 B2 | 12/2007 | Walmsley | |
| 7,352,317 B1 | 4/2008 | Finley et al. | |
| 7,352,929 B2 | 4/2008 | Hagen et al. | |
| 7,372,394 B1 | 5/2008 | Woodell et al. | |
| 7,383,131 B1 | 6/2008 | Wey et al. | |
| 7,417,579 B1 | 8/2008 | Woodell | |
| 7,486,219 B1 | 2/2009 | Woodell et al. | |
| 7,486,220 B1 | 2/2009 | Kronfeld et al. | |
| 7,492,304 B1 | 2/2009 | Woodell et al. | |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,613 B1 | 5/2009 | Thompson et al. | |
| 7,541,971 B1 | 6/2009 | Woodell et al. | |
| 7,576,680 B1 | 8/2009 | Woodell | |
| 7,598,901 B2 | 10/2009 | Tillotson et al. | |
| 7,598,902 B1 | 10/2009 | Woodell et al. | |
| 7,609,200 B1* | 10/2009 | Woodell et al. | 342/26 B |
| 7,616,150 B1 | 11/2009 | Woodell | |
| 7,633,431 B1 | 12/2009 | Wey et al. | |
| 7,639,175 B1 | 12/2009 | Woodell | |
| 7,696,921 B1 | 4/2010 | Finley et al. | |
| 7,714,767 B1 | 5/2010 | Kronfeld et al. | |
| 7,843,380 B1 | 11/2010 | Woodell | |
| 7,859,448 B1* | 12/2010 | Woodell et al. | 342/26 B |
| 7,859,449 B1 | 12/2010 | Woodell et al. | |
| 7,889,117 B1 | 2/2011 | Woodell et al. | |
| 7,917,255 B1 | 3/2011 | Finley | |
| 7,973,698 B1 | 7/2011 | Woodell et al. | |
| 8,072,368 B1 | 12/2011 | Woodell | |
| 8,248,274 B2 | 8/2012 | Christophe et al. | |
| 8,515,600 B1 | 8/2013 | McCusker | |
| 8,902,100 B1 | 12/2014 | Woodell et al. | |
| 2003/0001770 A1 | 1/2003 | Cornell et al. | |
| 2003/0016156 A1 | 1/2003 | Szeto et al. | |
| 2005/0049789 A1 | 3/2005 | Kelly et al. | |
| 2006/0036366 A1 | 2/2006 | Kelly et al. | |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

U.S. Appl. No. 11/863,219, filed Sep. 27, 2007, Woodell.
U.S. Appl. No. 11/899,801, filed Sep. 6, 2007, Woodell et al.
U.S. Appl. No. 13/183,314, filed Jul. 14, 2011, Sishtla et al.
Action Closing Prosecution (37 CFR 1.949) in Inter Parties Reexamination of U.S. Patent 7,161,525, control No. 95/001,860, mail date Nov. 15, 2012, 62 pages.
Decision on Appeal for Inter Parties Reexamination Control No. 95/001,860, dated Oct. 17, 2014, 17 pages.
Examiner's Answer to Appeal Brief in Inter Parties Reexamination of U.S. Patent 7,161,525, control No. 95/001,860, mail date Aug. 20, 2013, 3 pages.
Exhibits Filed by Third Party in Inter Parties Reexamination of U.S. Patent 7,161,525, control No. 95/001,860, filed May 30, 2012, 7 pages.
Honeywell, RDR-4B Forward Looking Windshear Detection/Weather Radar System User'S Manual With Radar Operation Guidelines (Rev. 6) Jul. 2003, 106 pages.
Kuntman et al., Turbulence Detection and Avoidance System, International Air Safety Seminar, Oct. 29, 2000, 13 pages.
Kuntman, Daryal, "Airborne System to Address Leading Cause of Injuries in Non-Fatal Airline Accidents," ICAO Journal, vol. 5, No. 2, Mar. 2000, 4 pages.
Nathanson, Fred E., "Radar and Its Composite Environment," Radar Design Principles, Signal Processing and the Environment, 1969, 5 pages, McGraw-Hill Book Company, New York et al.
Non-Final Office Action in Inter Parties Reexamination of U.S. Patent 7,161,525, control No. 95/001,860, mail date Mar. 2, 2012, 28 pages.
Notice of Allowance on U.S. Appl. No. 11/323,196 mailed on Apr. 19, 2010 (CTX-185US).
Notice of Appeal to the Patent Trial and Appeal Board in Inter Parties Reexamination of U.S. Patent 7,161,525, control No. 95/001,860, dated Mar. 4, 2013, 2 pages.
Order Granting Request for Inter Parties Reexamination in Inter Parties Reexamination of U.S. Patent 7,161,525, control No. 95/001,860, mail date Mar. 2, 2012, 21 pages.
Original Request for Inter Parties Reexamination of U.S. Patent No. 7,161,525 filed by Honeywell International Inc., and supporting exhibits in Inter Parties Reexamination of U.S. Patent 7,161,525, control No. 95/001,860, filed Dec. 21, 2011.
Patent Owner's Response to Board Decision in Inter Parties Reexamination of U.S. Patent 7,161,525, control No. 95/001,860 including Exhibits A, B, and C, filed Nov. 17, 2014, 65 pages.
Patent Owner's Response to Office Action in Inter Parties Reexamination of U.S. Patent 7,161,525, control No. 95/001,860 filed May 1, 2012, 57 pages.
Respondent's Brief in Inter Parties Reexamination of U.S. Patent 7,161,525, control No. 95/001,860, filed Jun. 21, 2013, 29 pages.
Right of Appeal Notice in Inter Parties Reexamination of U.S. Patent 7,161,525, control No. 95/001,860, mail date Feb. 22, 2013, 63 pages.
Third Party Requester Comments submitted by Honeywell International Inc. in Inter Parties Reexamination of U.S. Patent 7,161,525, control No. 95/001,860, 34 pages.
Third Party Requester's Brief on Appeal in Inter Parties Reexamination of U.S. Patent 7,161,525, control No. 95/001,860, filed May 22, 2013, 46 pages.
Third Party Requester's Rebuttal Brief in Inter Parties Reexamination of U.S. Patent 7,161,525, control No. 95/001,860, filed Sep. 20, 2013, 21 pages.
U.S. Appl. No. 12/075,103, filed Mar. 7, 2008, Woodell et al.
Advisory Action dated Jun. 24, 2010 for U.S. Appl. No. 10/978,680 (3 pages).
Advisory Action for U.S. Appl. No. 12/075,103, mail date Nov. 8, 2010, 3 pages.
Advisory Action for U.S. Appl. No. 12/075,103, mail date Oct. 15, 2010, 3 pages.
AN/APG Active Electronically Scanned Array AESA, www.globalsecurity.org/military/systems/aircraft/systems/an-apg-aesa.htm, retrieved on Feb. 26, 2013, 6 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.
Doviak et al., Doppler Radar and Weather Observations, 1984, 298 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Meteorological/KSCC/L71557/Lighting Detection and Ranging (LDAR), Jan. 2002, 12 pages.

(56) References Cited

OTHER PUBLICATIONS

Notice of Allowance for U.S. Appl. No. 10/631,253, mail date Jul. 28, 2005, 7 pages.
Notice of Allowance for U.S. Appl. No. 11/256,845, mail date May 27, 2009, 7 pages.
Notice of Allowance for U.S. Appl. No. 11/370,085, mail date Dec. 30, 2008, 6 pages.
Notice of Allowance for U.S. Appl. No. 11/402,434, mail date Nov. 4, 2008, 6 pages.
Notice of Allowance for U.S. Appl. No. 11/515,642, mail date Jun. 24, 2010, 6 pages.
Notice of Allowance for U.S. Appl. No. 12/360,651, mail date Sep. 23, 2011, 6 pages.
Notice of Allowance for U.S. Appl. No. 12/405,091, mail date Mar. 19, 2012, 8 pages.
Office Action for U.S. Appl. No. 11/256,845, mail date Aug. 21, 2007, 4 pages.
Office Action for U.S. Appl. No. 10/631,253, mail date Jan. 14, 2004, 5 pages.
Office Action for U.S. Appl. No. 10/631,253, mail date Jun. 30, 2004, 4 pages.
Office Action for U.S. Appl. No. 11/256,845, mail date Dec. 5, 2006, 5 pages.
Office Action for U.S. Appl. No. 11/256,845, mail date Jul. 28, 2008, 5 pages.
Office Action for U.S. Appl. No. 11/256,845, mail date Jun. 22, 2006, 5 pages.
Office Action for U.S. Appl. No. 11/370,085, mail date Aug. 15, 2007, 10 pages.
Office Action for U.S. Appl. No. 11/370,085, mail date Dec. 4, 2007, 13 pages.
Office Action for U.S. Appl. No. 11/370,085, mail date Oct. 9, 2008, 5 pages.
Office Action for U.S. Appl. No. 11/402,434, mail date Jul. 17, 2008, 5 pages.
Office Action for U.S. Appl. No. 11/402,434, mail date Mar. 29, 2007, 8 pages.
Office Action for U.S. Appl. No. 11/402,434, mail date Oct. 26, 2006, 7 pages.
Office Action for U.S. Appl. No. 11/402,434, mail date Sep. 20, 2007, 7 pages.
Office Action for U.S. Appl. No. 11/515,642, mail date Dec. 22, 2008, 5 pages.
Office Action for U.S. Appl. No. 11/515,642, mail date Feb. 12, 2008, 7 pages.
Office Action for U.S. Appl. No. 11/515,642, mail date Jan. 5, 2010, 5 pages.
Office Action for U.S. Appl. No. 12/075,103, mail date Feb. 26, 2010, 11 pages.
Office Action for U.S. Appl. No. 12/075,103, mail date Jul. 29, 2010, 7 pages.
Office Action for U.S. Appl. No. 12/075,103, mail date Jun. 20, 2012, 5 pages.
Office Action for U.S. Appl. No. 12/075,103, mail date Nov. 29, 2012, 6 pages.
Office Action for U.S. Appl. No. 12/405,091, mail date Aug. 18, 2011, 7 pages.
Office Action for U.S. Appl. No. 12/405,091, mail date Feb. 25, 2011, 6 pages.
Office Action on U.S. Appl. No. 13/760,964 Dated Apr. 23, 2014, 7 pages.
Pessi et al., On the Relationship Between Lightning and Convective Rainfall Over the Central Pacific Ocean, date unknown, 9 pages.
Waldvogel et al., The Kinetic Energy of Hailfalls. Part I: Hailstone Spectra, Journal of Applied Meteorology, Apr. 1978, 8 pages.
Zipser et al., The Vertical Profile of Radar Reflectivity and Convective Cells: A Strong Indicator of Storm Intensity and Lightning Probability? America Meteorological Society, 1994, 9 pages.

* cited by examiner

SYSTEM FOR AND METHOD OF WEATHER PHENOMENON DETECTION USING MULTIPLE BEAMS

BACKGROUND

The present specification relates generally to a weather radar system. More particularly, the present specification relates to beams or beam patterns for detecting a weather phenomenon.

U.S. Pat. No. 5,311,183 discloses an aircraft weather radar system. Conventional aircraft weather radar systems are capable of scanning for certain weather phenomena, such as wind shear, turbulence or micro-burst situations. U.S. Pat. No. 6,388,608 assigned to the assignee of the present application and incorporated herein by reference discloses a weather radar system with wind shear detection capabilities. U.S. Pat. No. 6,388,608 discloses an embodiment that detects turbulence, micro-bursts or wind shear by scanning at two or more tilt angles using a radar antenna and determining wind speeds at various elevations. Windshear, turbulence or microburst warnings are generally desirable when the airplane is in the landing, taxi and take-off modes.

Reducing antenna size on weather radar systems is desirous, especially on smaller aircraft (e.g., business and regional jets). Larger antenna size adds to the size drag and/or weight of the aircraft. However, the wider radar beam associated with a smaller antenna increases the probability of false alarms during weather phenomenon detection, such as, wind shear, turbulence and/or micro-burst detection. The false alarms can be due to ground clutter targets and targets outside of the flight path of the aircraft.

Accordingly, there is a need for a scanning strategy for detecting weather phenomena, such as wind shear, microburst and/or turbulence that is less susceptible to false alarms. There is also a need for a radar system that intermixes radar beams with independent pointing angles or beam shapes to obtain returns for predicting wind shear. There is also a need for a radar system and process that takes advantage of all or some possible transmitter and receiver sampling times to implement beam diversity and increase robustness of wind shear detection. Further, there is a need for a cost effective robust wind shear detection system for use with smaller antennas, such as electronically scanned antennas selectable subaperture antennas. Yet further, another need exists for a system and method of hazard detection with minimal false alarms while using a small antenna.

SUMMARY

An exemplary embodiment relates to a method of using avionic weather radar. The method includes providing a first radar pulse at a first beam position during a radar scan and receiving a first return, the first radar pulse being a velocity sampling beam. The method also includes providing a second radar pulse at a second and different beam position during the radar scan and receiving a second return, the second radar pulse overlaps and is not identical to the first radar pulse. The method further includes providing a third radar pulse using a broader antenna pattern with lower gain at the first beam position during the radar scan and receiving a third radar return, the third radar pulse being a side lobe detection beam. The broader beam antenna pattern may be generated in a multitude of ways including use of only a selectable subaperture. The method can also include processing the first return, the second return and the third return and using data associated with the first return, the second return and the third return to determine a presence of weather phenomenon and to identify and remove returns from non-weather targets.

Another exemplary embodiment relates to weather radar system coupled to a weather radar antenna. The weather radar system includes a memory, and a processor coupled to the antenna and directing the antenna. The processor directs the antenna to provide a first radar pulse at a first beam position during a radar scan and receive a first return, the first radar pulse being a velocity sampling beam. The processor also directs the antenna to provide a second radar pulse at a second beam position during the radar scan and receive a second return, the second radar pulse overlaps and is not identical to the first radar pulse. The processor further directs the antenna to provide a third radar pulse driven by a selectable subaperture at the first beam position during the radar scan and receive a third radar return, the third radar pulse being a side lobe detection beam. The processor stores return data associated with the first pulse in the memory, return data associated with the second pulse in the memory, and return data associated with the third return in the memory and uses the return data associated with the first pulse, the return data associated with the second pulse, and return data associated with the third pulse to identify returns from non-weather targets. The processor determines a presence of wind shear.

A further exemplary embodiment relates to an apparatus for sensing weather. The apparatus includes means for receiving a first return associated with a velocity sampling beam provided during a radar scan, a second return associated with a non-identical, overlapping radar beam provided during the scan, a third radar return associated with a side lobe detection beam provided during the scan. The apparatus also includes means for processing the first return, the second return and the third return, and using data associated with the first return, data associated with the second return, and data associated with the third return to remove non-weather targets when determining a presence of wind shear.

An exemplary embodiment relates to a method of using an avionic weather radar. The method includes providing a first radar pulse or beam during a radar scan and receiving a first return, the first radar pulse being a velocity sampling beam. The method also includes providing a second radar pulse or beam during the radar scan and receiving a second return, the second radar pulse overlaps the first radar pulse. The method further includes providing a third radar pulse or beam during the radar scan and receiving a third radar return, the third radar pulse being a side lobe detection beam. The method can also include processing the first return, the second return and the third return and using data associated with the first return, the second return and the third return to determine a presence of weather phenomenon.

In certain embodiments, the first radar pulse, the second radar pulse and the third radar pulse can be provided sequentially and/or simultaneously and can be coded separately for identification of individual returns resulting from each of the individual radar pulses. Selectable sub-apertures or electronic scanned array can be used to provide the first, second and third radar pulses according to some embodiments.

Another exemplary embodiment relates to a weather radar system coupled to a weather radar antenna. The weather radar system includes a memory and a processor. The processor is coupled to the antenna and directs the antenna to provide a first radar pulse, a second radar pulse and a third radar pulse. The first radar pulse is a velocity sampling beam. The second radar pulse overlaps the first radar pulse, and the third radar pulse is a side lobe detection beam. The processor stores return data associated with the first pulse, the second pulse and the third pulse in memory and uses the return data to determine a presence of wind shear.

Yet another exemplary embodiment relates to an apparatus for sensing weather. The apparatus includes means for receiving a first return associated with a velocity sampling beam, a second return associated with an overlapping radar beam, and a third radar return associated with a side lobe detection beam. The apparatus also includes a means for processing the first return, the second return and the third return and using data associated with the first return, the second return and the third return to determine a presence of wind shear.

Still another exemplary embodiment relates a method of using an avionic weather radar. The method includes providing a first radar pulse or beam during a radar scan and receiving a first return, the first radar pulse being a velocity sampling beam. The method also includes providing a second radar pulse or beam during the radar scan and receiving a second return, the second radar pulse overlaps the first radar pulse. The method further includes providing a third radar pulse or beam during the radar scan and receiving a third radar return, the third radar pulse being a side lobe detection beam. The method further includes providing a fourth radar pulse or beam during the radar scan and receiving a fourth radar return, the radar pulse being a rain cell check beam. The method can also include processing the first return, the second return, the third return and the fourth return and using data associated with the first return, the second return, the third return, and the fourth return to determine a presence of weather phenomenon.

Another exemplary embodiment relates to weather radar system coupled to a weather radar antenna. The weather radar system includes a memory, and a processor coupled to the antenna and directing the antenna. The processor directs the antenna to provide a first radar pulse at a first beam position during a radar scan and receive a first return, the first radar pulse being a velocity sampling beam. The processor also directs the antenna to provide a second radar pulse at a second beam position during the radar scan and receive a second return, the second radar pulse overlaps and is not identical to the first radar pulse. The processor further directs the antenna to provide a third radar pulse driven during the radar scan and receive a third radar return, the third radar pulse being a side lobe detection beam. The processor further directs the antenna to provide a fourth radar pulse driven at a third beam position during the radar scan and receive a fourth radar return, the fourth radar pulse being a rain cell check beam. The processor stores return data associated with the first pulse in the memory, return data associated with the second pulse in the memory, return data associated with the third pulse in memory, and return data associated with the fourth return in the memory and uses the return data associated with the first pulse, the return data associated with the second pulse, return data associated with the third pulse, the return data associated with the fourth pulse to determine a presence of wind shear.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
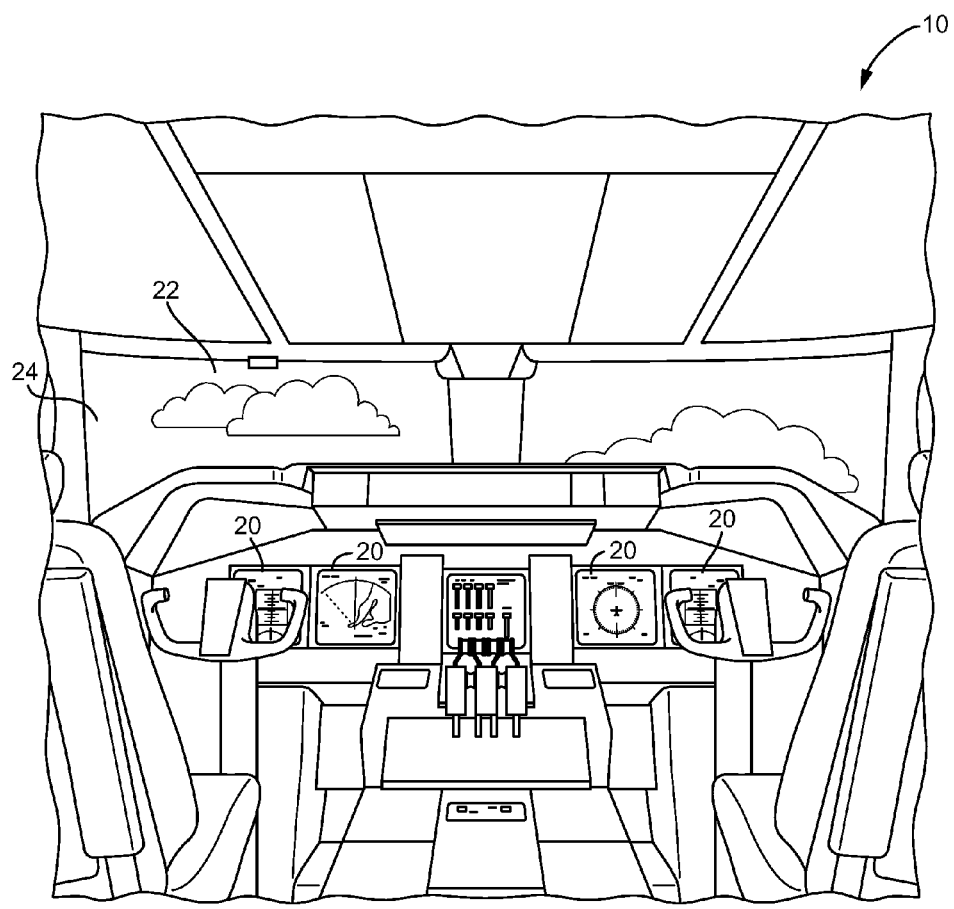
FIG. 1 is a perspective view schematic illustration of an aircraft control center, according to one exemplary embodiment.

Before describing in detail the particular improved system and method, it should be observed that the invention includes, but is not limited to a novel structural combination of conventional data/signal processing components and sensing circuits, and not to the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes at least one flight display 20. The pilot may use flight display 20 to increase visual range and to enhance decision-making abilities. In an exemplary embodiment, flight display 20 may be configured to show weather, terrain, fixed obstacles, variable obstacles (e.g., other aircraft), flight characteristics (e.g., altitude or speed), or any combination thereof.

Figure 2:
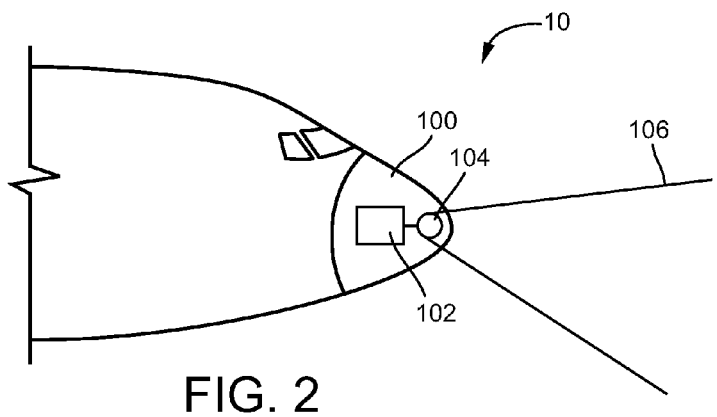
FIG. 2 is a partial side view schematic illustration of an aircraft including the aircraft control center illustrated in FIG. 1, according to an exemplary embodiment.

In FIG. 2, the front of an aircraft is shown with aircraft control center 10 and nose 100, according to an exemplary embodiment. A radar system 102 is generally located inside nose 100 of the aircraft. According to other exemplary embodiments, radar system 102 may be located at the top of the aircraft or on the tail of the aircraft. In an exemplary embodiment, radar system 102 can be a weather radar system that is adapted to use a multiplexed beam pattern in a radar scan 106 to sense weather phenomena such as wind shear. Radar scan 106 can scan 30 degrees in azimuth per second in one embodiment.

Advantageously, system 102 can be utilized to sense a variety of weather phenomenon, including wind shear and other hazards using an antenna 104. An electronic or mechanical steering mechanism or combination thereof can be used to steer antenna 104 according to azimuth angles and tilt angles. According to one embodiment, system 102 is capable of providing transmit pulses with independent beam shapes and beam directions during radar scan 106. In one embodiment, antenna 104 provides a set of pulses, beams or sub-beams. The set of pulses is optimized for wind shear detection using antenna 104. The set of pulses can be provided simultaneously or sequentially in one embodiment.

System 102 can use signal encoding techniques to differentiate returns from each independent pulse during radar scan 106 in one embodiment. Robust target editing techniques are used on the returns to remove side lobe targets and ground targets to reduce false alarms. Target editing can be an angle based processes that are similar to in-range editing processes that are done for high spectral targets (e.g. spectral width editing for ground moving targets or moving propellers/turbines in a single range resolution cell) in one embodiment.

In one embodiment, system 102 provides the set of pulses using antenna differentiation processes discussed in U.S. Pat. No. 7,639,175; U.S. Pat. Nos. 7,843,380; 7,889,117; and 7,616,150; U.S. application Ser. No. 13/183,314, Jul. 14, 2011, now U.S. Pat. No. 9,019,145; U.S. application Ser. No. 11/900,002, filed Sep. 6, 2007 now U.S. Pat. No. 7,859,449; U.S. application Ser. No. 11/899,801, filed Sep. 6, 2007 now U.S. Pat. No. 7,859,448; U.S. application Ser. No. 11/851,323, filed Sep. 6, 2007 now U.S. Pat. No. 8,515,600; U.S. patent application Ser. No. 11/863,215, filed Sep. 6, 2007 now U.S. Pat. No. 7,639,175; and U.S. patent application Ser. No. 11/863,219, filed Sep. 6, 2007 now U.S. Pat. No. 7,616,150, all assigned to the assignee of this patent application and incorporated herein by reference in their entireties. In one embodiment, target editing can use the angle within the beam to target as determined by system 102 using aperture differentiation techniques. The angle within the beam can be used to locate the target.

In an exemplary embodiment, the set of pulses from radar antenna 104 associated with radar system 102 can be shaped or pointed using selectable subapertures on antenna 104. A second pulse can overlap but is different than (e.g., intersects with, includes but is not the same as, or is exclusive of) a first pulse using antenna differentiation. In one embodiment, return data associated with the first portion and the second portion are correlated for editing in radar system 102.

Alternatively, radar antenna 104 can be an active electronically scanned antenna (AESA) array or active phase antenna. Antenna 104 can be comprised of an array of individual steerable elements. The elements can be solid state transmit/receive modules. The modules can provide signals at different frequencies or with different coding. Beams may be aimed from the AESA antenna by emitting separate radio waves from each module that interfere constructively at certain angles in front of antenna 104. Antenna 104 can be steered by using phase delays. In one embodiment, antenna 104 can include or be used with two or more receivers.

In one embodiment, antenna 104 associated with radar beam 106 is a smaller antenna, such as those suitable for business and regional systems (BRS) aircraft (e.g., antenna 104 can have an 18 inch diameter or less). In one embodiment, antenna 104 can have a diameter of less than 28 inches, have a diameter between 12 and 14 inches or have a diameter of 12 inches or less for X-band radars. Radar antenna 104 can be a weather radar antenna having an area of less than 25 square inches in one embodiment. Antenna 104 can be of various shapes and can be of conventional size in one embodiment.

System 102 advantageously uses target editing to reduce false alarms associated with wind shear detection in one embodiment rather than relying exclusively on conventional velocity editing. System 102 can correlate data from multiple independent pulses (with independent pointing angles or beams shapes) to identify and remove targets outside of the flight path and targets associated with ground clutter. The correlation can use beam pointing angles to locate and correlate targets for editing. The remaining targets are analyzed to determine wind velocities, make a wind shear, microburst, or turbulence determination and to provide the warning on display 20.

Figure 3:
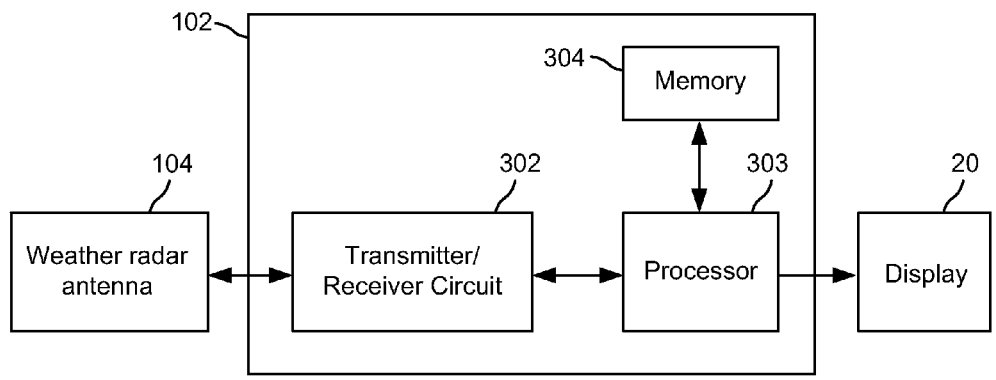
FIG. 3 is a more detailed block diagram of a weather radar system for use in the aircraft illustrated in FIG. 2.

Referring to FIG. 3, radar system 102 includes a processor 303, display 20, a memory 304, a transmit/receiver circuit 302 and radar antenna 104 in one-embodiment. In one embodiment, processor 303 controls antenna 104 to provide multiplexed pulses using antenna 104 configured as a selectable subaperture antenna. Although system 102 is discussed below as an avionic radar system, system 12 can also by a ground-based or naval based radar system. The principles of the invention and the beams sets described herein can be used on other platforms including terrestrial platforms without departing from the scope of the invention. In one embodiment, portions of antenna 104 are used to simultaneously provide three or more pulses that have independent beam directions and/or beam shapes. In one embodiment, two pulses have independent beam directions, and one pulse has an independent beam direction and beam shape. The three pulses or beams can be a full aperture radial velocity sensing beam, an upper subaperture radial velocity sensing beam, and a left subaperture side lobe detection beam according to one embodiment. Although specific beam types and orders are discussed above and below, other beam types and orders can be utilized without departing from the scope of the invention.

In another embodiment, processor 303 controls antenna 104 configured as an AESA and provides three beams similar to the beams discussed above. The three beams can be a full aperture radial velocity sensing beam, an upper overlapping beam for elevation sensing, and a wider beam with lower gain for side lobe sensing. According to an alternative embodiment, processor 303 controls antenna 104 to provide a fourth beam having an independent beam shape and direction. The fourth beam can be a rain cell check beam or rain cell test beam in one embodiment.

Processor 303 receives independent radar returns from each pulse. The pulses can be coded according to frequency, modulation, symbol code, etc. to allow for independent reception of data. Data for each return is stored in memory 304. Processor 303 uses data from each return for the weather phenomena detection, (e.g., wind shear detection). Ground targets can be edited out using data stored in memory 304 associated with a full aperture radial velocity sensing beam and an upper aperture radial velocity sensing beam in one embodiment (or upper overlapping beam). An angle point editing scheme can be utilized to identify targets associated with ground clutter. An angle point editing scheme can also be used to edit side lobe targets using data stored in memory 304 associated with the full aperture radial velocity sensing beam and a side lobe detection beam.

In one embodiment, each of the three beams is provided at 3 kHz pulse repetition frequency for a total of a 9 kHz operation (12 kHz for a four beam operation). This interleaved operation allows each pulse to produce returns up to five nautical miles in range. This pattern of interleaved pulses repeats at the same set of beam angles over a 60 ms time.

Figures 4, 5:
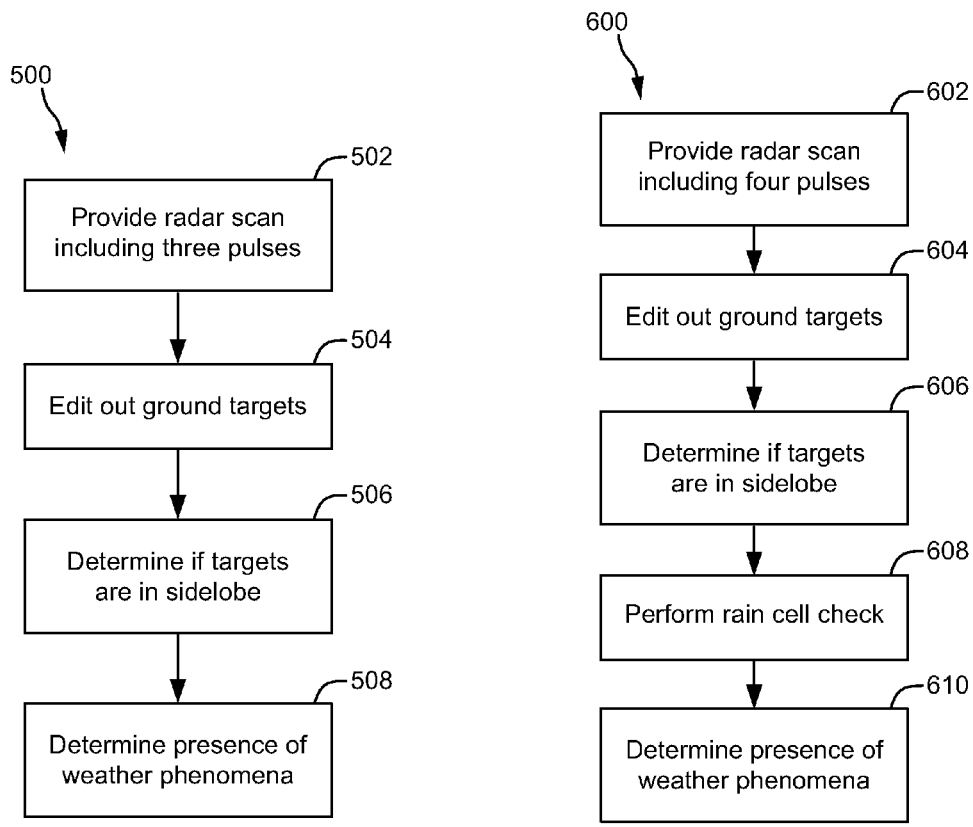
FIG. 4 is a flow diagram showing operation of the weather radar system illustrated in FIG. 3 in accordance with an exemplary embodiment.
FIG. 5 is a flow diagram showing operation of the weather radar system illustrated in FIG. 3 in accordance with another exemplary embodiment.

With reference to FIGS. 3 and 4, radar system 102 can perform process 500 and provides at least three beams for weather phenomenon detection at a step 502. Each beam has an independent shape and direction. The three pulses can be a full aperture radial velocity sensing beam, an upper subaperture radial velocity sensing beam, and a left subaperture side lobe detection beam according to one embodiment. Data associated with each return is stored in memory 304 for processing by processor 303.

At a step 504, processor 303 receives data associated with the three pulses and edits out ground targets. Ground targets can be edited out using data stored in memory 304 associated with a full aperture radial velocity sensing beam and an upper subaperture radial velocity sensing beam.

At a step 506, targets identified using the full aperture radial velocity sensing beam can be analyzed to determine if the targets are in a side lobe using data associated with the left subaperture for azimuthal side lobe detection beam stored in memory 304. Targets that are in the side lobe can be eliminated when sensing for wind shear during a landing in one embodiment. The target can be considered part of the side lobe if its return strength for the side lobe beam is greater than the return strength of the target for the radial velocity sensing beam. Targets in side lobe during landing can often be associated with ground targets or structures. At a step 508, processor 303 determines the presence of weather phenomena using the data associated with the three pulses.

With reference to FIG. 5, the system 102 can perform a process 600 similar to process 500 in accordance with an alternative embodiment. Processor 303 controls system 102 to provide a radar scan including four beams. The four beams can be a full aperture radial velocity sensing beam, an upper overlapping beam for elevation sensing, a rain cell test beam, wider beam width and low gain for side lobe detection. The wider/low gain beam can be provided by a hard switched subaperture or by adjusting the phase and amplitude of the individual elements of antenna 104 (e.g., an ESA antenna) to "spoil" the beam to broaden its beam width and lower its gain. Four independent pulses for 2.0-4.3 milliseconds at a pulse repetition frequency of 3 kHz can be provided for a total of a 12 kHz operation in one embodiment. Such a pulse length allows target at ranges as short as 2 kilometers to be sampled and allows a 5 nautical mile sample range to be repeated.

At a step 602, radar antenna 104 provides a radar scan including four pulses or beams. At a step 604, ground targets are edited out using data from returns associated with the four pulses (e.g., at least two of the pulses). In one embodiment, processor 303 uses data associated with the full aperture radial velocity sensing beam and upper overlapping beam at a slightly higher elevation used to identify and remove ground targets. At a step 606, processor 303 determines if any of the targets are in the side lobe in a step similar to step 506 by using data from the lower gain and wider azimuth beam side lobe detection beam.

At a step 608, returns associated with a rain cell check pulse are analyzed to determine if precipitation is present. If the rain cell check indicates that no precipitation is present, the modeled vertical hazard estimate is reduced or eliminated in one embodiment. In one embodiment, the modeled vertical hazard estimate is added to the modeled horizontal hazard estimate which is based on the radial velocity gradient to make the wind shear warning. The reduction in the modeled vertical hazard estimate may be sufficient to cancel a proposed wind shear warning when no precipitation is present. Gust fronts still can produce a hazard or wind shear warning even though they have a neither a vertical movement component nor a parent rain cell over the top of the sampled event. Thus, even though the modeled vertical hazard estimate is removed from the total hazard calculation, a warning can be issued based upon a large horizontal hazard estimate.

The pulse for the rain cell check is generally a pulse that is provided in a somewhat vertical direction to determine if precipitation exists above and in front of the aircraft. At a step 610, the presence of weather phenomena is determined in a step similar to step 508. Step 610 can utilize the rain cell check to eliminate the provision of a warning in the event that precipitation is not present in front of the aircraft. In one alternative embodiment, the rain cell test beam can be optional.

Figure 6:
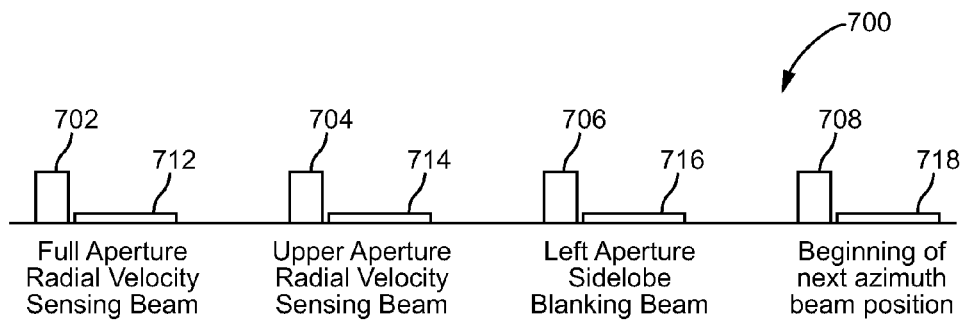
FIG. 6 is a diagram showing a beam set for the system illustrated in FIG. 3 in accordance with an exemplary embodiment.

With reference to FIG. 6, processor 303 controls system 102 to provide a radar pulse set 700 comprised of a full aperture radial velocity sensing beam 702, an upper aperture radial velocity sensing beam 704 and a left aperture side lobe detection beam 706. A next beam set can begin with a beam 708 which can be the next full aperture radial velocity sensing beam for the next beam set. Although specific apertures are mentioned, other embodiments can use different apertures (right lower, middle, etc.).

Antenna 104 receives return 712 associated with beam 702, returns 714 associated with beam 704, returns 716 associated with beam 706 and returns 718 associated with beam 708. Each pulse or beam 702, 704, 706 or 708 can be repeated at a 3, kilohertz rate allowing a current five nautical mile sample range to be repeated. Beams 702 and 704 can utilize a Multi-Scan™ system-like operation to identify whether a radar return originates from ground level and thereby sense ground clutter. In one embodiment, returns can be merged, cross qualified, and aligned in a process similar to the process discussed in U.S. Pat. Nos. 6,388,607; 6,424,288; and 6,603,425 incorporated herein by reference in their entireties.

Returns can be utilized to determine radial outflows for wind shear detection. Beams 702, 704 and 706 can be provided in any order. Although specific pulse lengths, listening periods, dwell times, and frequencies are disclosed, those parameters can be adjusted for system criteria and design parameters without departing from the scope of the invention.

As shown in FIG. 6, a dwell time (e.g., 30-60 ms) can be provided between beams 702, 704, 706 and 708. Advantageously, pulses or beams 702, 704, 706 and 708 can be intermixed to take advantage of dead time in a normal velocity sampling system to implement beam diversity and increased robustness of wind shear detection. Angle domain editing of clutter returns can be achieved by processor 304 using beam 704. According to one embodiment, robustness at all scan angles, not just along the direction of flight, is achieved.

Figure 7:
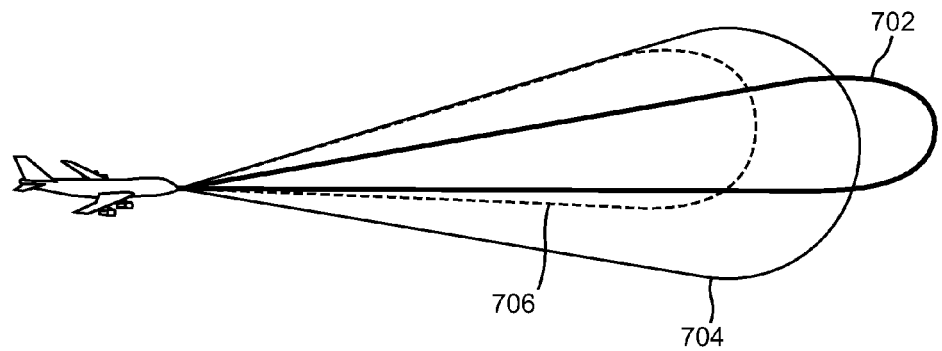
FIG. 7 is a diagram showing elevation coverage of the beam set illustrated in FIG. 6 in accordance with an exemplary embodiment.
Figure 8:
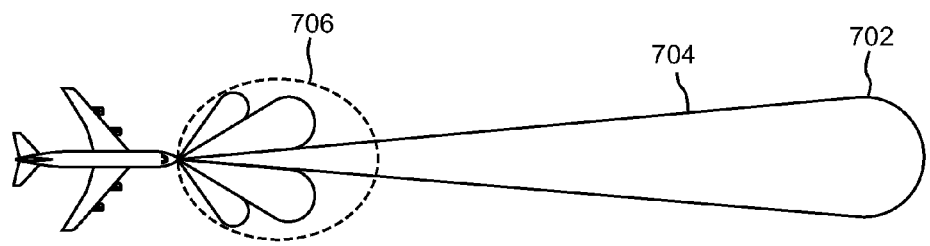
FIG. 8 is a diagram showing azimuth coverage of the beam set illustrated in FIG. 6 in accordance with an exemplary embodiment.

With reference to FIG. 7 elevation coverage associated with beams 702, 704 and 706 is shown. Beam 704 overlaps and is not identical to beam 702 in one embodiment. Beam 706 overlaps beam 702 and is within beam 704 in one embodiment. With reference to FIG. 8, beams 702 and 704 have a similar azimuth coverage while beam 706 has a wider azimuth coverage in one embodiment.

Figure 9:
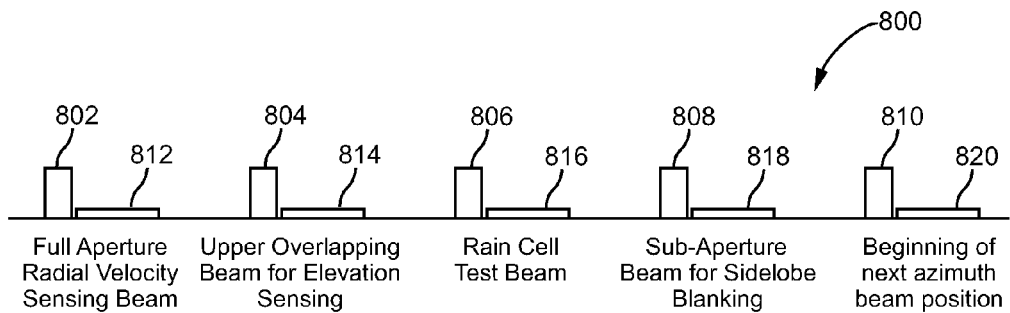
FIG. 9 is a diagram showing a beam set for the weather radar system illustrated in FIG. 3 in accordance with another exemplary embodiment.

With reference FIG. 9, system 102 can be configured to provide a pulse set 800 including a full aperture radial velocity sensing beam 802, an upper overlapping beam 804 for elevation sensing, a rain cell test beam 806, and a wider beam 808 with lower gain for side lobe blanking in one embodiment. A beam 810 can be utilized in a next beam set at a next azimuth position. A return 812 is associated with beam 802, a return 814 is associated with beam 804, a return 816 is associated with beam 806 and a return 818 is associated with beam 808. Beam 806 can be optional.

Beams 802, 804 and 808 are similar to beams 702, 704 and 706, respectively. Beam set 800 is preferably provided using an AESA radar system. Beams 802, 804, 806 and 808 can be utilized in process 600 discussed with reference to FIG. 5 and beam 702, 704, and 706 can be utilized in the process 500 discussed above with respect to FIG. 4.

Figure 10:
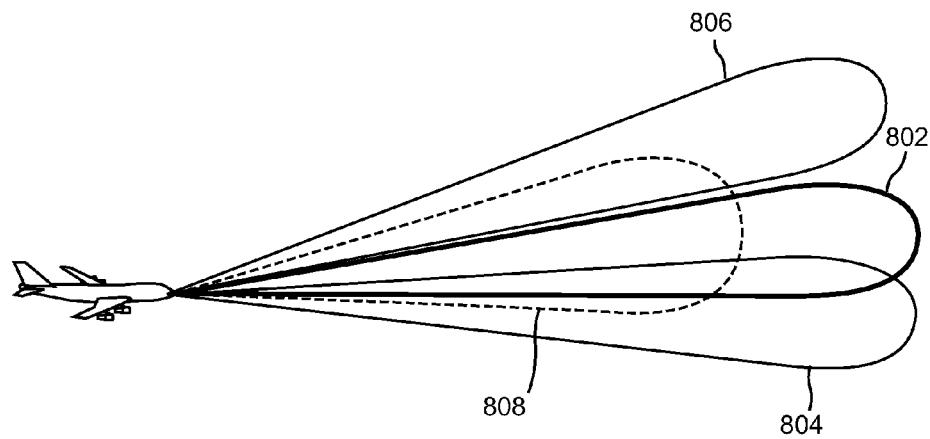
FIG. 10 is a diagram showing elevation coverage of the beam set illustrated in FIG. 9 in accordance with an exemplary embodiment.
Figure 11:
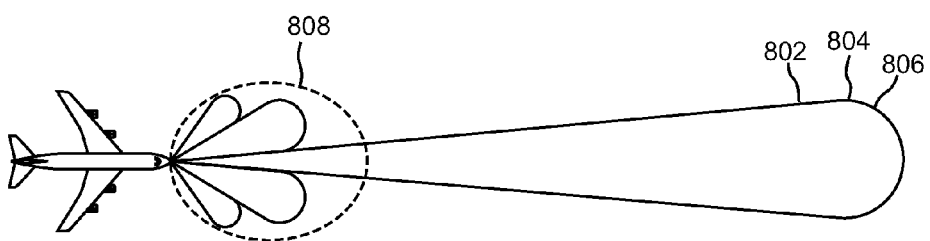
FIG. 11 is a diagram showing azimuth coverage of the beam set illustrated in FIG. 9 in accordance with an exemplary embodiment.

With reference to FIG. 10, beam 804 has a lower elevation coverage than beam 802 and intersects beam 802 in one embodiment. Beam 808 has an elevation coverage which encompasses beam 802 and beam 806 has an elevation coverage above beam 802 in one embodiment. As shown in FIG. 11, the azimuth coverage for beams 802, 804 and 806 is similar while the azimuth coverage for beam 808 is wider than beams 802, 804 and 806 in one embodiment.

Pulse sets 700 and 800 are advantageously configured as intermixed pulses and/or beams that take advantage of dead time and normal velocity sampling systems to implement beam diversity and increased robustness of wind shear detection in one embodiment. Pulse set 800 advantageously supports a rain cell test via beam 806 without requiring additional scan time. Beams 702, 704, 706 can be coherently integrated together, and beams 802, 804, 806 and 808 can be coherently integrated in one embodiment. Beams 702, 704 and 706 and beams 802, 804, 806 and 808 can be provided sequentially in the patterns shown in FIGS. 6 and 9. In one embodiment, pulse set 700 can be utilized with a rain cell test beam provided in a separate antenna sweep.

Figure 12:
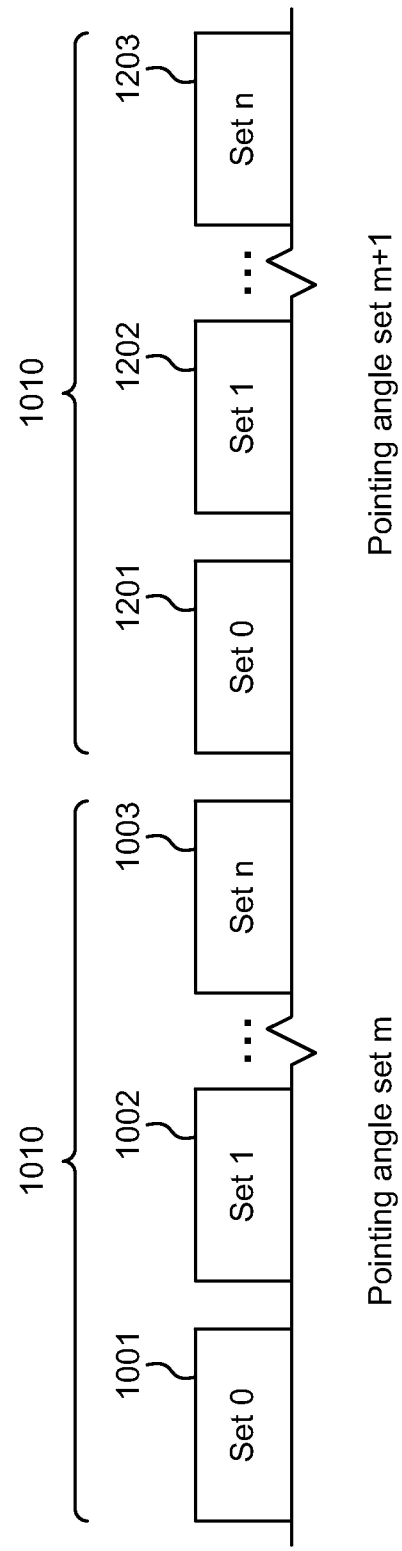
FIG. 12 is a diagram showing beam sets provided during dwell times for the weather radar system illustrated in FIG. 3 in accordance with another exemplary embodiment.

With reference to FIG. 12, beam sets 1001, 1002, and 1003 can be provided by system 102 during a dwell time 1010. Dwell time 1010 (e.g., 30-60 ms) can be used to send a number (e.g. 64, 100, 128, or any number suitable for system 30) of pulses or beam sets 1001, 1002, and 1003 while antenna 104 is pointed at a particular direction. Returns from beam sets 1001, 1002, and 1003 can be processed together. Dwell time 1015 can be used to send a number (e.g. 64, 100, 128, or any number suitable for system 30) of beam sets 1201, 1202, and 1203 while antenna 104 is pointed at another location. Returns from beam sets 1201, 1202, and 1203 can be processed together. Beam sets 1001, 1002, 1003, 1201, 1202, and 1203 can be the same or similar to pulse sets 800 and 900 discussed above. Beams sets 1001, 1002, 1003, 1201, 1202, and 1203 include receive times for returns.

Processor 303 can generate a velocity parameter or other Doppler data, a spectral width parameter, a reflectivity parameter, and a range parameter based on return data in memory 304. According to various exemplary embodiments, processor 303 can be any hardware and/or software processor or processing architecture capable of executing instructions and operating on data related to hazard detection and display. Processor 303 and memory 304 can be part of a hardware platform associated with a Rockwell Collins WXR-2100 radar system. According to various exemplary embodiments, memory 304 can be any volatile or non-volatile memory capable of storing data and/or instructions related to hazard warning systems.

Memory 304 is preferably capable of storing in a readily addressable and rapidly retrievable manner, data sets resulting from antenna sweeps and can be a multi-scan, multi-tilt angle memory. Although preferred types of memory are discussed as memory 304, system 102 can utilize any type of storage system capable of storing radar returns or associated data for analysis/processing by processor 303. In one alternative embodiment, memory 304 can be a volumetric storage unit or a planar-based storage unit using polynomials for storage of return characteristics. Display 20 can be part of an avionic multi-function display (MFD) unit, be a dedicated display, or be associated with other equipment.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps and signal types can be modified. The hardware and software configurations shown and described may differ depending on the chosen performance characteristics and physical characteristics of the computing devices. For example, the type of computing device, communications bus, or processor used may differ. Further, the configuration shown and described in the block diagram may be varied without departing from the scope of the invention. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of using an airborne weather radar, the method comprising:
    providing a first radar pulse at a first beam position during a radar scan and receiving a first return, the first radar pulse being a velocity sensing beam;
    providing a second radar pulse at a second beam position during the radar scan and receiving a second return, the second radar pulse overlaps and is not identical to the first radar pulse;
    providing a third radar pulse using a lower gain with a wider beam width at the first beam position during the radar scan and receiving a third radar return, the third radar pulse being a side lobe detection beam; and
    processing the first return, the second return and the third return and using data associated with the first return, the second return and the third return to identify and remove non-weather targets weather phenomena detection.

2. The method of claim 1, wherein the first radar pulse, the second radar pulse and third radar pulse are provided simultaneously and coded separately.

3. The method of claim 1, wherein the weather phenomenon is a wind shear hazard and the data associated with the second return is used to remove ground targets from the data associated with the first return, and the data associated with the first return includes spectral width data and the data associated with the second return is used to determine a presence of the weather phenomenon.

4. The method of claim 1, wherein the ground targets are removed using angle domain editing.

5. The method of claim 1, further comprising:
    providing a fourth radar pulse during the radar scan and receiving a fourth radar return, the first radar pulse being a rain cell test beam, wherein the weather phenomenon is wind shear and the method further comprises processing the fourth radar return, and using data associated with the fourth radar return to determine a presence of weather phenomenon.

6. The method of claim 1, wherein side lobe targets are removed using the third radar return, wherein the side lobe targets are identified when the third radar return is larger in strength than the first radar return.

7. The method of claim 1, wherein the first, second and third pulses are provided using a split aperture antenna.

8. The method of claim 1, wherein the first, second and third pulses are provided using an electronic scanning antenna.

9. A weather radar system coupled to a weather radar antenna, the weather radar system comprising:
- a memory;
- a processor coupled to the antenna and directing the antenna to provide:
- a first radar pulse at a first beam position during a radar scan and receive a first return, the first radar pulse being for velocity sampling;
- a second radar pulse at a second beam position during the radar scan and receive a second return, the second radar pulse overlaps and is not identical to the first radar pulse;
- a third radar pulse at the first beam position having a lower gain and a wider beam width than the first radar pulse during the radar scan and receive a third radar return, the third radar pulse being for side lobe detection; and
- wherein the processor stores return data associated with the first radar pulse in the memory, return data associated with the second radar pulse in the memory, and return data associated with the third radar pulse in the memory and uses the return data associated with the first radar pulse, the return data associated with the second radar pulse, and the return data associated with the third radar pulse to identify returns from non-weather targets and wherein the processor determines a presence of wind shear.

10. The weather radar system of claim 9, wherein the processor removes ground targets using the return data associated with the first radar pulse, and the return data associated with the second radar pulse.

11. The weather radar system of claim 10, wherein the processor uses angle domain editing to remove the ground targets.

12. The weather radar system of claim 11, wherein the processor determines if a target is in a side lobe using the return data associated with the third radar pulse.

13. The weather radar system of claim 12, wherein the target is considered in the side lobe if power is higher in the return data associated with the third return than in the return data associated with the first return.

14. The weather radar system of claim 9, wherein the weather radar antenna is a selectable subaperture antenna.

15. The weather radar system of claim 9, wherein the weather radar antenna is an electronically scanned antenna.

16. The weather radar system of claim 15, wherein the processor directs the antenna to provide a fourth radar pulse during the radar scan, the fourth radar pulse for a rain test and wherein the processor stores return data associated with the fourth radar pulse in the memory, and uses the return data associated with the fourth radar pulse to determine the presence of wind shear.

17. An apparatus for sensing weather, the apparatus comprising:
- means for receiving a first return associated with a velocity sampling beam provided during a radar scan, a second return associated with a non-identical, overlapping radar beam provided during the radar scan, and a third radar return associated with a side lobe beam provided during the radar scan; and
- means for processing the first return, the second return and the third return, and using data associated with the first return, data associated with the second return, and data associated with the third return to remove non-weather targets when determining a presence of wind shear.

18. The apparatus of claim 17, wherein the means for receiving is a split selectable subaperture antenna.

19. The apparatus of claim 18, wherein the means for receiving is an electronically steered antenna.

20. The apparatus of claim 17, wherein the velocity sampling beam, the overlapping radar beam, and the side lobe beam are each provided at 3 KHz sampling rate.

\* \* \* \* \*